US00RE34220E

United States Patent [19]

Kennedy et al.

[11] E Patent Number: Re. 34,220

[45] Reissued Date of Patent: Apr. 13, 1993

[54] CONTRACTIBLE MINE STOPPING AND CONTRACTIBLE BLOCK MEMBER FOR USE THEREIN

[75] Inventors: William R. Kennedy; John M. Kennedy, both of Taylorville, Ill.

[73] Assignee: Jack Kennedy Metal Products and Buildings, Inc., Taylorville, Ill.

[21] Appl. No.: 862,195

[22] Filed: Apr. 2, 1992

Related U.S. Patent Documents

Reissue of:

[64] Patent No.: 4,915,540
Issued: Apr. 10, 1990
Appl. No.: 361,211
Filed: Jun. 5, 1989

[51] Int. Cl.[5] ..... E21F 1/14

[52] U.S. Cl. ..... 405/132; 405/150.1; 405/288; 52/573; 248/548; 248/900; 188/377

[58] Field of Search ..... 405/132, 150.1, 288, 405/303, 289, 290; 248/548, 900; 52/573, 66; 188/377, 371

[56] References Cited

U.S. PATENT DOCUMENTS

| | | | |
|---|---|---|---|
| 3,586,131 | 6/1971 | Lemire | 188/371 |
| 3,921,240 | 11/1975 | Fyfe | 52/573 X |
| 4,052,029 | 10/1977 | Townsend | 248/548 |
| 4,352,484 | 10/1982 | Gertz et al. | 188/377 X |
| 4,492,291 | 1/1985 | Chometon et al. | 52/573 X |
| 4,516,879 | 5/1985 | Berry et al. | 405/132 |
| 4,601,367 | 7/1986 | Bongers | 188/377 |
| 4,815,565 | 3/1989 | Sicking et al. | 256/1 |
| 4,820,081 | 4/1989 | Kennedy et al. | 405/132 |

*Primary Examiner*—Dennis L. Taylor
*Attorney, Agent, or Firm*—Senniger, Powers, Leavitt & Roedel

[57] ABSTRACT

A contractible mine stopping adapted to be installed to extend as a vertical wall from the floor to the roof of a passageway in a mine, comprising a series of rows of substantially solid substantially non-compressible blocks of substantially fire-resistant material stacked one on top of another, and at least one row of contractible substantially fire-resistant block-like members adapted to contract without loss of structural integrity when the wall is subjected to a compressive load, as during a convergence of the floor and roof on the passageway. Each block-like member is preferably a hollow metal member which, when subjected to a compressive load, is adapted to contract heightwise of the member a distance corresponding to at least a major portion of the height of the member without loss of structural integrity of the member.

21 Claims, 1 Drawing Sheet

CONTRACTIBLE MINE STOPPING AND CONTRACTIBLE BLOCK MEMBER FOR USE THEREIN

Matter enclosed in heavy brackets [ ] appears in the original patent but forms no part of this reissue specification; matter printed in italics indicates the additions made by reissue.

BACKGROUND OF THE INVENTION

This invention relates to mine stoppings, and in particular to a contractible mine stopping adapted to accommodate the convergence of the floor and roof of a passageway.

So-called mine "stoppings" are widely used in mines to stop off flow of air in passages in the mines, a stopping being generally installed at the entrance of a passage to block the flow of air therethrough. A problem encountered with at least some of the prior art mine stoppings is the loss of structural integrity of the stopping upon the vertical convergence of the floor and roof of the passageway when there is a shifting and heaving of the mine in the vicinity of the passageway. Such temporary shifting and heaving can cause permanent deformation of the stopping, resulting in the creation of air gaps between the stopping and the passageway, and defeating the air-blocking function of the stopping. Furthermore, even where the convergence is permanent, the stoppings can deform so much under the compressive load that the stopping loses its structural integrity causing air leaks, and potential failure of the stopping.

It is believed that certain prior art mine stoppings have incorporated a yieldable material (e.g., expanded polysterene plastic) in an attempt to resolve the aforementioned problem, but such material is not fireproof, which presents a serious problem.

SUMMARY OF THE INVENTION

It is, therefore, among the several objects of the present invention to provide an improved mine stopping which retains its structural integrity on relative vertical convergence of the floor and roof of a passageway; the provision of such a mine stopping which is fireproof; and the provision of such a stopping adapted to maintain a seal against the roof of the passageway. It is further among the objects of this invention to provide such a stopping that is of simple and inexpensive construction, and which can be quickly and easily erected.

The mine stopping of the present invention is adapted to be installed to extend as a vertical wall from the floor to the roof of a passageway in a mine. The mine stopping generally comprises a series of rows of substantially non-compressible blocks of substantially fire-resistant material stacked one on top of another. The mine stopping further comprises at least one row of contractible, substantially fire-resistant block-like members adapted to contract without loss of structural integrity when the stopping is subject to a compressive load as during the convergence of the floor and roof of the passageway. Each block-like member is preferably a hollow metal member which, when subjected to a compressive load, is adapted to contract heightwise of the member a distance corresponding to at least a major portion of the height of the member without loss of structural integrity of the member.

Thus, the mine stopping of the present invention effectively blocks a mine passageway and retains its structural integrity upon relative vertical convergence of the floor and roof of the passageway. Furthermore the mine stopping maintains a seal with the roof of the passage during and after such convergence of the floor and roof. The mine stopping is of simple and inexpensive construction, and can be quickly and easily erected.

These and other advantages will be in part apparent andin part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENTS

Figure 1:
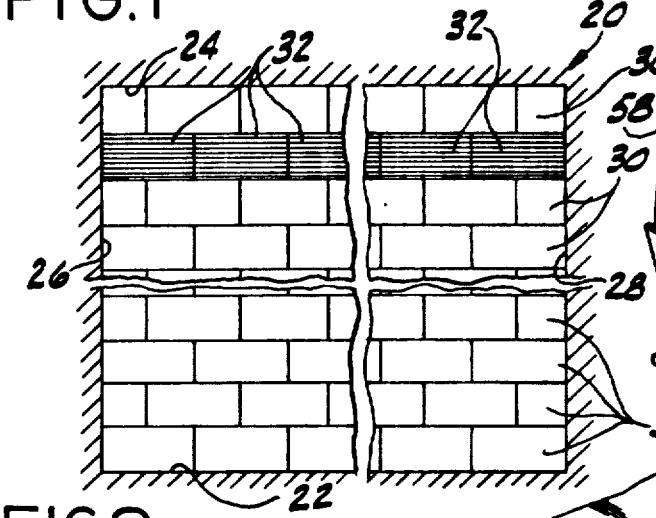
FIG. 1 is a front elevation view of a mine stopping constructed according to the principles of this invention, shown as it would be erected to block a mine passageway.

A mine stopping constructed according to the principles of this invention is indicated generally as 20 in FIG. 1. The mine stopping 20 is adapted to be installed to extend as a vertical wall from the floor 22 to the roof 24 of a passageway in a mine, between ribs 26 and 28 at opposite sides of the passageway. The mine stopping 20 comprises a series of rows of substantially solid, substantially non-compressible blocks 30 of substantially fire resistant material stacked one on top of another. The mine stopping further comprises at lest one row of contractible, substantially fire-resistant block-like members 32 adapted to contract without loss of structural integrity when the wall of stopping is subjected to a compressive load, a during the convergence of the floor 22 and roof 24 of the passageway. In the preferred embodiment there is one row of such block-like members 32, and this row is positioned second from the top row. However, the row could be positioned elsewhere or more than one row could be used.

The block-like members 32 are preferably hollow members made of metal. These members, when subjected to a compressive load, are adapted to contract heightwise of the member a distance corresponding to a major portion of the height of the member without loss of structural integrity. Furthermore, when subjected to a substantially uniform compressive load, the members are preferably adapted to contract at a substantially uniform rate over a distance corresponding to at least a major portion of the height of the member (e.g., 30–90% of the full height of the member when not contracted).

Figure 2:
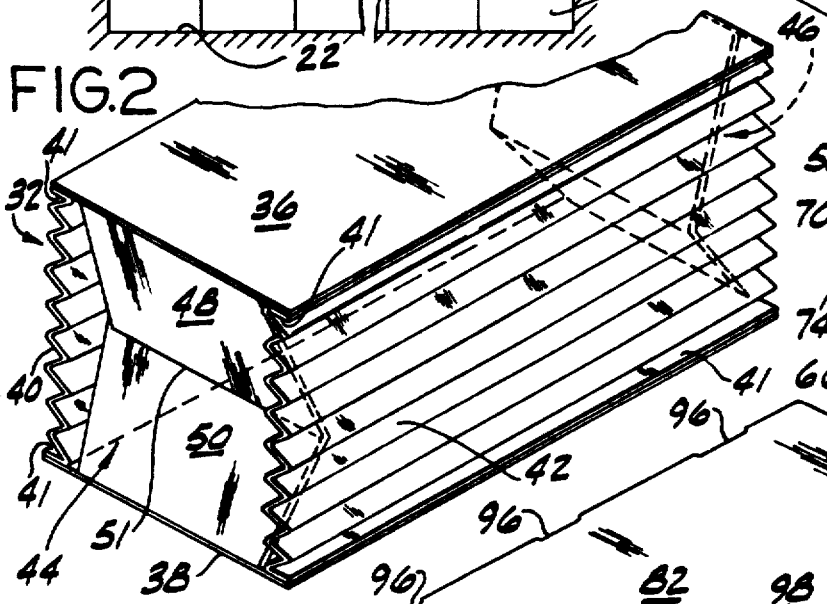
FIG. 2 is a partial perspective view of a first embodiment of a contractible block-like member adapted for use in the mine stopping of this invention.

FIG. 2 is a partial perspective view of a block-like member 32 as incorporated into the stopping 20 shown in FIG. 1. As illustrated, the block-like member comprises a top wall 36, a bottom wall 38, and opposite side walls 40 and 42. The side walls 40 and 42 have horizontally extending accordian folds or pleats formed therein to permit contraction in the vertical direction when the block-like member is subjected to a compressive load. The side walls 40, 42 have horizontal flanges 41 along their upper and lower edges secured (as by spot welding) to the top and bottom walls 36 and 38, respectively.

The block-like member 32 preferably also includes end walls 4 an 46 which provide lateral stability to the block and which are adapted to contract when the top wall 36 is subjected to a compressive load. The end walls 44 and 46 are preferably generally V-shaped as viewed from the side, each comprising an upper panel connected (e.g., by spot welding) along its top edge to the top wall 36 of the block-like member, and a lower panel 50 connected (e.g., by spot welding) along its bottom edge to the bottom wall 38 of the block-like member. The upper and lower panels 48, 50 are connected to one another along a hinge line 51 extending transversely of the end wall to permit pivotal action between the panels. Hinge line 51 may be formed by an integral hinge between the panels, for example.

Figure 3:
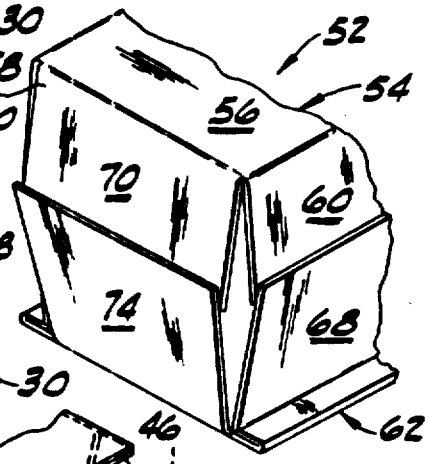
FIG. 3 is partial perspective view of a second embodiment of a contractible block-like member adapted for use in the mine stopping of this invention.
Figure 4:
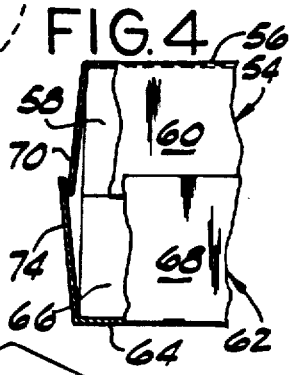
FIG. 4 is a partial side elevation view of the second embodiment of the contractible block-like member.

FIG. 3 is a partial perspective view of a second embodiment of a contractible block-like member of the present invention, indicated generally as 52. In this embodiment the block-like member 52 comprises the upper member generally designated 54 having a web 56 constituting the top wall of the member, and two depending side flanges 58 and 60. The block-like member 52 also comprises a lower member generally designated 62 having a web 64 constituting the bottom wall of the member, and two upstanding side flanges 66 and 68 at opposite sides of the web 64 having a telescoping interference fit with the depending side flanges 58, 60 of the upper member 54, the side flanges of the upper and lower members being adapted to telescope relative to one another when a compressive load is applied to the top wall 56 of the block-like member. The upper member 54 may further include a depending flange 70 at each end (one of which is shown in FIGS. 3 and 4); and the lower member 64 may further include an upstanding end flange 74 at each end (one of which is shown in FIGS. 3 and 4) having a telescoping interference fit with a respective end flange 70 of the upper member 54.

Figure 5:
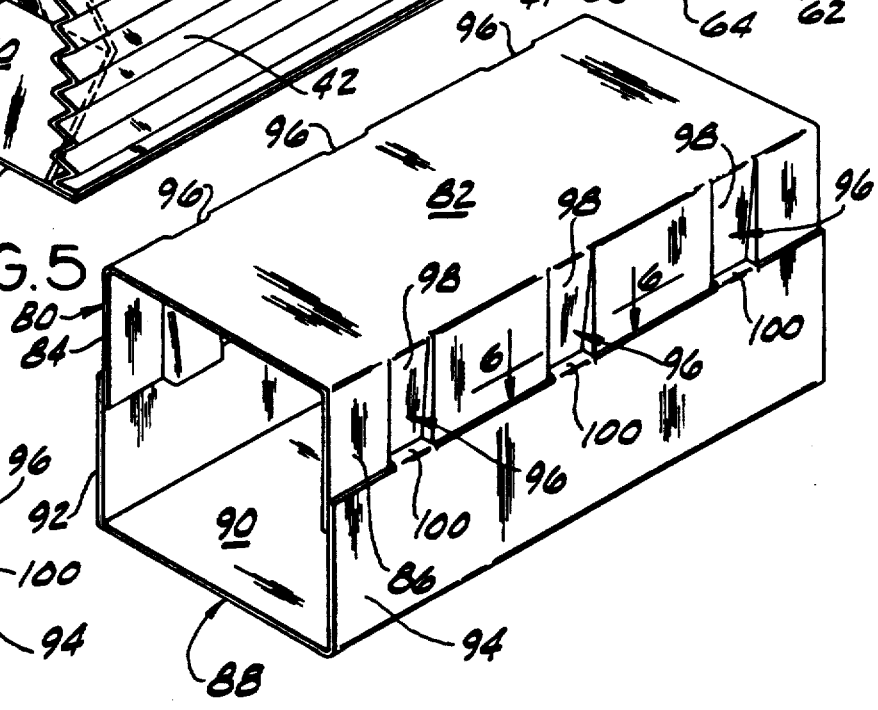
FIG. 5 is partial perspective view of a third embodiment of a contractible block-like member adapted for use in the mine stopping of this invention.
Figure 6:
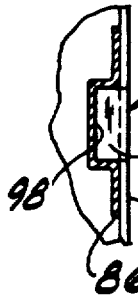
FIG. 6 is a partial cross-section view of the third embodiment of the block-like member, taken along the plane of line 6—6 in FIG 5.

FIG. 5 is a partial perspective view a third embodiment of a contractible block-like member of this invention, indicated generally as 78. The block-like member of this embodiment comprises an upper member generally designated 80 having a web 82 constituting the top wall of the member, and two depending side flanges 84 and 86. The block-like member 78 also includes a lower member generally designated 88 having a web 90 constituting the bottom wall of the member, and two upstanding side flanges 92 and 94 at opposite sides of the web 90 having a telescoping interference fit with the depending side flanges of the upper member 80, the side flanges of the upper and lower members 80, 88 being adapted to telescope relative to one another when a compressive load is applied to the top wall of the block-like member. One of the top or bottom members 80 or 88, and preferably the top member 80, has a plurality of generally vertical corrugations 96 forming ramps 98 sloping laterally outwardly in the upward direction. These ramps are shown in cross-section in FIG. 6. The other of the top or bottom members, in the preferred embodiment the bottom member 88, has a plurality of inwardly extending tabs 100, one for each corrugation 96, the inner edge of which engages the surface of the ramp. The engagement of the tabs 200 and the ramps 98 provides increasing resistance to compression as the block-like members 78 contracts. End walls (not shown), such as those incorporated in the first embodiment 32 or second embodiment 52 may be incorporated into the third embodiment 78, if desired.

The contractible block-like members 32, 52 and 78 described above may be fabricated from metal such as sheet steel of suitable gauge. In block-like member 32, the top and bottom walls 36 and 38 may be made from 12–14 gauge steel and the side walls 40 and 42 could be made from 14–20 gauge sheet steel. In block-like member 52 and 78, the block-like members could be made from 12–14 gauge sheet steel.

OPERATION

According to the present invention, a mine stopping 20 is erected in a passageway by assembling rows of blocks 30 to extend between the ribs 26 and 28 of the passageway and from the floor 22 to the roof 24 of the passageway. At least one row, however, is comprised of contractible block-like members 32, 52, or 78 disclosed herein. The inclusion of at least one row of the block-like members enables the stopping to contract vertically, as during the convergence of the floor and roof of the passageway, without losing structural integrity.

If block-like members 32 of the first embodiment are used, the pleated sidewalls 40 and 42 and the V-shaped endwalls 44 and 46 permit vertical contraction of the block-like member without loss of structural integrity of the member. The end walls 44 and 46 provide lateral stability, i.e. transverse of the sidewalls. If block-wall members 58 of the second embodiment are used, the telescopically interfitting flanges 58, 60 and 66, 68, and the telescopically interfitting end flanges 70 and 74 permit vertical contraction of the block-like member without loss of structural integrity of the member. Likewise, of block-like members 78 of the third embodiment are used, the telescopically interfitting flanges 84, 86 and 92, 94 permit vertical contraction of the block-like member without loss of structural integrity of the member.

It will be observed from the foregoing that the contractibility of the block-like members 32, 52, and 78 as used in a stopping 20 permits the stopping to accommodate a convergence of the roof and floor of a mine passageway without harmful deformation of the mine stopping. As a consequence, the stopping is adapted to maintain its sealing fit with the roof and floor of the passageway and with the ribs at opposite sides of the passageway. Moreover, because the block-like members are of metal, a mine stopping can be constructed entirely from material which is fireproof.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A contractible mine stopping adapted to be installed to extend as a vertical wall from the floor to the roof of a passageway in a mine, said wall comprising a series of rows of substantially solid substantially non-compressible blocks of substantially fire-resistant material stacked one on top of another, and at least one row of contractible substantially fire-resistant [block-like] members adapted to contract without loss of structural integrity when the wall is subjected to a compressive load, as during a convergence of the floor and roof of the passage-way, each [block-like] *contractible* member being a [hollow] metal member which, when subjected to a compressive load, is adapted to contract heightwise of the member a distance corresponding to at least a major portion of the height of the member without loss of structural integrity of the member.

2. A contractible mine stopping as set forth in claim 1 wherein said [block-like] *contractible* member, when subjected to a substantially uniform compressive load, is adapted to contract at a substantially uniform rate over a distance corresponding to at least said major portion of the height of the member.

3. A contractible mine stopping as set forth in claim 2 wherein said [block-like] *contractible* member has a top wall, a bottom wall and opposite contractible side walls adapted to contract when the top wall of the [block-like] *contractible* member is subjected to a compressive load.

4. A contractible mine stopping as set forth in claim 3 wherein said contractible side walls have pleats formed therein.

5. A contractible mine stopping as set forth in claim 4 wherein said [block-like] *contractible* member has contractible end walls adapted to contract when the top wall of the [block-like] *contractible* member is subjected to a compressive load.

6. A contractible mine stopping as set forth in claim 5 wherein each end wall is generally V-shaped as viewed from the side, comprising upper and lower end panels connected along one of their edges to respective top and bottom walls of the [block-like] *contractible* member and along their opposite edges to one another to permit pivotal action between the panels.

7. A contractible mine stopping as set forth in claim 3 wherein said [block-like] *contractible* member comprises an upper member having a web constituting the top wall of the [block-like] *contractible* member and two depending side flanges at opposite sides of the web, and a lower member having a web constituting the bottom wall of the [block-like] *contractible* member and two upstanding side flanges at opposite sides of the web having a telescoping interference fit with the depending side flanges of the upper member, the side flanges of the upper and lower members being adapted to telescope relative to one another when a compressive load is applied to the top wall of the [block-like] *contractible* member.

8. A contractible mine stopping as set forth in claim 7 wherein the side flanges of one of said upper and lower members have generally vertical corrugations therein to provide said interference fit.

9. A contractible mine stopping as set forth in claim 8 wherein said upper member has depending end flanges and said lower member has upstanding end flanges having a telescoping interfit with the depending end flanges of said upper member.

10. A contractible mine stopping as set forth in claim 7 wherein the side flanges of at least one of said upper and lower members diverge in the direction away from the web of the member to provide said interference fit.

11. A contractible mine stopping as set forth in claim 10 wherein said upper member has depending end flanges and said lower member has upstanding end flanges having a telescoping interfit with the depending end flanges of said upper member.

12. A substantially fire-resistant [block-like] *contractible* member adapted to be used as a contractible component of a mine stopping to be installed to extend from the floor to the roof of a passageway in a mine, said [block-like] *contractible* member being a [hollow] metal member having a top wall, [a bottom wall] and *at least one* contractible side [walls] *wall* which [are] *is* adapted to contract when a compressive load is applied to the top wall of the [block-like] *contractible* member, as during a convergence of the floor and roof of the passageway, said side [walls] *wall* being formed to contrat a distance corresponding to at least a major portion of the height of the [block-like] *contractible* member wthout loss of structural integrity of the member.

13. A [block-like] *contractible* member as set forth in claim 12 wherein said side [walls are] *wall is* adapted to contract at a substantially uniform rate over a distance corresponding to at least said major portion of the height of the block-like] *contractible* member when the latter is subjected to a substantially uniform compressive load.

14. A [block-like] *contractible* member as set forth in claim 13 wherein said contractible side [walls have] *wall has* pleats formed therein.

15. A [block-like] *contractible* member as set forth in claim 14 further comprising contractible end walls adapted to contract when the top wall of the [block-like] *contractible member is subjected to a compressive load.*

16. A [block-like] *contractible* member as set forth in claim 15 wherein each end wall is generally V-shaped as viewed from the side, comprising upper and lower end panels connected along one of their edges to respective top and bottom walls of the [block-like] *contractible* member and along their opposite edges to one another to permit pivotal action between the panels.

17. A [block-like] *contractible* member as set forth in claim 13 further comprising an upper member having a web constituting the top wall of the [block-like] *contractible* member and two depending side flanges at opposite sides of the web, and a lower member having a web constituting the bottom wall of the [block-like] *contractible* member and two upstanding side flanges at opposite sides of the web having a telescoping interference fit with the depending side flanges of the upper member, the side flanges of the upper and lower members being adapted to telescope relative to one another when a compressive load is applied to the top wall of the [block-like] *contractible member.*

18. A [block-like]*contractible* member as set forth in claim 17 wherein the side flanges of one of said upper and lower members having generally vertical corrugations therein to provide said interference fit.

19. A [block-like] *contractible* member as set forth in claim 18 wherein said upper member has depending end flanges and said lower member has upstanding end flanges having a telescoping interfit with the depending end flanges of said upper member.

20. A [block-like] *contractible* member as set forth in claim 17 wherein the side flanges of at least one of said upper and lower members diverge in the direction away from the web of the member to provide said interference fit.

21. A [block-like] *contractible* member as set forth in claim 20 wherein said upper member has depending end flanges and said lower member has upstanding end flanges having a telescoping interfit with the depending end flanges of said upper member.

* * * * *